United States Patent

Tajima et al.

[11] Patent Number: 6,052,388
[45] Date of Patent: Apr. 18, 2000

[54] INFORMATION TRANSMISSION/ RECEPTION SYSTEM

[75] Inventors: Yoichiro Tajima, Kunitachi; Hiroshi Okano; Naruhiko Nihira, both of Tokyo, all of Japan

[73] Assignees: Casio Computer Co., Ltd.; Tokyo FM Broadcasting Co., Ltd., both of Tokyo, Japan

[21] Appl. No.: 08/894,199
[22] PCT Filed: Dec. 18, 1996
[86] PCT No.: PCT/JP96/03681
  § 371 Date: Aug. 14, 1997
  § 102(e) Date: Aug. 14, 1997
[87] PCT Pub. No.: WO97/23998
  PCT Pub. Date: Jul. 3, 1997

[30] Foreign Application Priority Data

Dec. 25, 1995 [JP] Japan ................................ 7-337310
Dec. 13, 1996 [JP] Japan ................................ 8-333980

[51] Int. Cl.[7] .................................................. H04L 12/50
[52] U.S. Cl. .......................... 370/475; 370/522; 455/158.4
[58] Field of Search .................................. 370/522, 524, 370/527, 532, 529, 528, 523, 349, 475; 455/154.1, 154.2, 158.4; 348/13; 340/825.54

[56] References Cited

U.S. PATENT DOCUMENTS 5,502,497  3/1996  Yamaashi et al. ...................... 348/473
5,838,668  11/1998  Okada et al. ........................... 370/312

FOREIGN PATENT DOCUMENTS 63 412/94      9/1994    Australia .
0 169 680 A1  10/1994    European Pat. Off. .
2 259 204      3/1993    United Kingdom .

Primary Examiner—Hassan Kizou
Assistant Examiner—Daniel Previl
Attorney, Agent, or Firm—Frishauf, Holtz, Goodman, Langer & Chick, P.C.

[57] ABSTRACT

An FM radio receiver receives and displays program data which is affixed with a return destination box number and return form type data and has been transmitted from an FM broadcasting station 1 in the multiplexed form on FM broadcast radio waves. In responding to a displayed program through the FM radio receiver, first, the FM radio receiver 2 reads a return form corresponding to the return form type data from a ROM card 24 and displays the form. A user inputs return message data according to the displayed return form. FM radio receiver 2 transmits the return destination box number data in addition to the return message data to a service center 5. The service center 5 stores the received return message data in a box corresponding to the return destination box number data affixed to the received return message data. The return message data is edited and collected box by box. The edited and/or collected results are sent to the FM broadcasting station 1 as needed.

33 Claims, 10 Drawing Sheets

ANSWER TO QUESTION → MAXIMUM OF 20 1-BYTE CHARACTERS

ANSWER TO QUESTION → ANSWER
 FREE MESSAGE OF100 BYTES LESS  } COMMENT INPUT COLUMN

BROADCASTING TRANSMISSION FORMAT

TRANSMISSION FORMAT

INFORMATION TRANSMISSION/ RECEPTION SYSTEM

TECHNICAL FIELD

The present invention relates to an information transmission/reception system for transmitting and receiving information, an information reception apparatus, an information transmission apparatus and methods of use corresponding therets. This invention is particularly suitable for use in an FM (Frequency Modulation) teletext broadcasting system, but is no way limited to such an application.

BACKGROUND ART

There is a service available whereby service information, such as character information, is multiplexed on an FM broadcast radio wave and is transmitted, and thereby the transmitted service information is received by a reception terminal to be displayed on a display means provided on the reception terminal. This service is called "FM teletext broadcasting" and has already been put to a practical use as visual information radio.

According to this FM teletext broadcasting, when an FM broadcast radio wave, which is acquired by frequency-multiplexing display information such as characters and/or numerals on an ordinary broadcast radio wave, is transmitted from an FM broadcasting station on the transmission side, a reception terminal, such as an FM radio receiver, which is equipped with a display like a liquid crystal display receives this FM broadcast radio wave. The reception terminal separates the received information into audio information and display information, and converts this display information to character codes to be displayed on the display to allow a user to see this display information. While listening to an FM radio program, therefore, the user can see information associated with the FM radio program, such as the title of a broadcast music piece, the name of the artist, comments and/or the number of requests. The user can also see news, weather information, traffic information or the like, which is not directly associated with broadcasting, as character information.

There is a plan for a bidirectional service which allows users not only to simply see character information transmitted from an FM broadcasting station but also to send a response to a broadcast quiz or questionnaires or a request or the like to a broadcast program (hereinafter, such response, request or the like will be referred to as return message data).

In this bidirectional service, for example, a user sends return message data via a telephone line to a broadcasting station from a reception terminal equipped with an auto-dialing function.

The broadcasting station that receives the return message data should check for which program each return message data has been sent, and must manage those return message data by performing tedious processing operations, such as collection and editing of the return message data. That is, the FM broadcasting station which receives the return message data must do a large amount of processing.

To reduce the amount processing carried out by the broadcasting station, each user may input through the reception terminal the name and the broadcasting date of a program to which his/her return message data is associated at the time of sending the return message data, or may prepare return message data according to a predetermined form. But, such a burden on users is troublesome.

DISCLOSURE OF INVENTION

It is therefore an object of the present invention to provide an information transmission/reception system which can allow a receiver to easily send return information and allow a transmitter to easily process return information.

To achieve the object, according to one preferred mode, there is provided an information transmission/reception system comprising an information transmission apparatus for broadcasting information and an information reception apparatus for receiving information broadcast from the information transmission apparatus, the information transmission apparatus including first information affixing means for affixing identification information indicative of a return destination to be affixed to return information for information to be broadcast, to the information to be broadcast; and broadcasting means for broadcasting the information affixed with the identification information by the first information affixing means, the reception apparatus including reception means for receiving the information and the identification information, both broadcast from the broadcasting means; input means for inputting return information for the information received by the reception means; second information affixing means for affixing the identification information received by the reception means to the return information input from the input means; and transmission means for transmitting the return information affixed with the identification information by the second information affixing means. This system can simplify a return operation on the reception side, and can simplify the collecting and editing processes of return information on the transmission side.

According to another preferred mode, there is provided an information transmission/reception system comprising an information transmission apparatus for transmitting information and an information reception apparatus for receiving information transmitted from the information transmission apparatus, the information transmission apparatus including information affixing means for affixing designation information designating a return form of return information for information to be transmitted, to the information to be transmitted; and first transmission means for transmitting the information affixed with the designation information by the information affixing means, the reception apparatus including reception means for receiving the information and the designation information, both transmitted from the first transmission means; storage means for storing plural types of return forms; input means for inputting return information in accordance with a return form designated by the designation information received by the reception means and stored in the storage means; and second transmission means for transmitting the return information input from the input means. This system can simplify a return operation on the reception side, and can simplify the collecting and editing processes of return information on the transmission side.

BEST MODES FOR CARRYING OUT THE INVENTION

One embodiment of the present invention as adapted to an FM radio receiver for receiving FM teletext broadcasting and an information transmission/reception system which includes this FM radio receiver, will now be described referring to the accompanying drawings.

Figure 1:
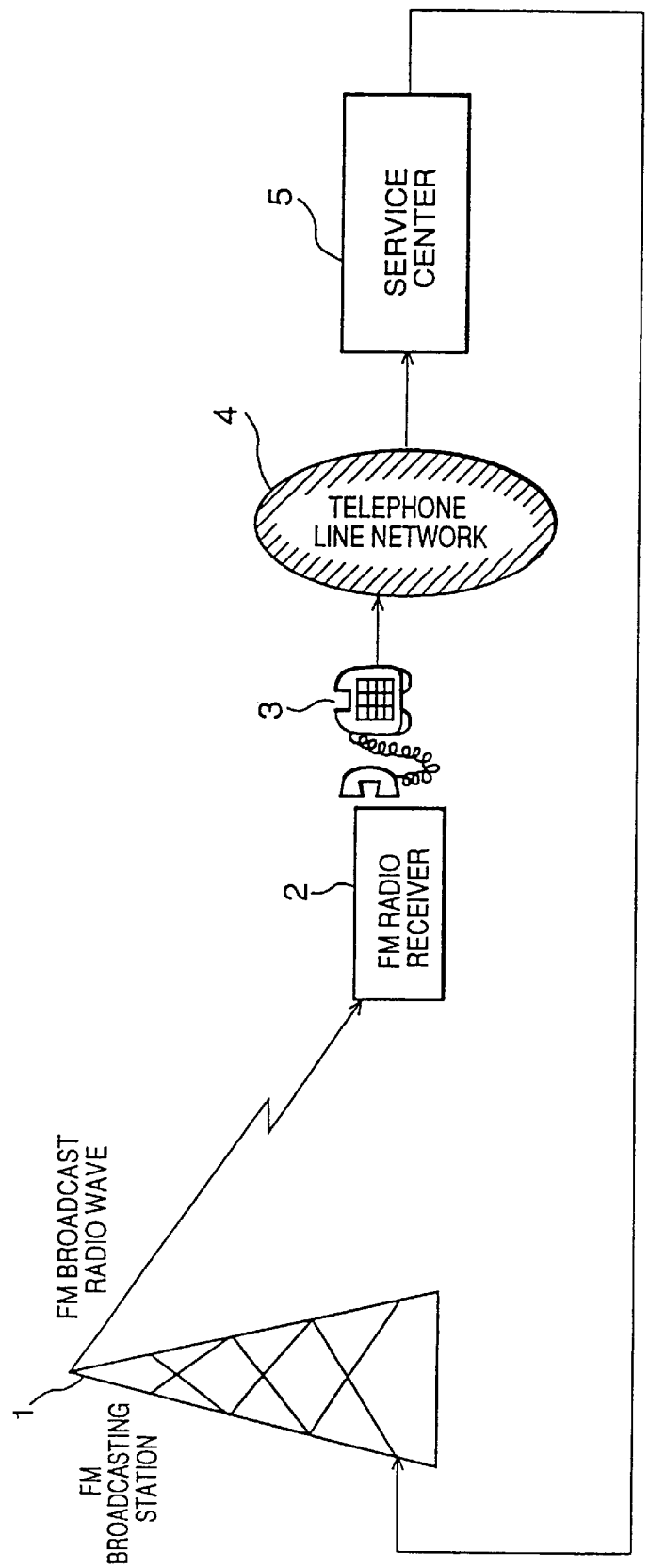
FIG. 1 is a diagram illustrating the structure of an FM teletext broadcasting system according to one embodiment of this invention.

FIG. 1 shows the structure of the entire system. This system includes an FM broadcasting station 1 which transmits FM broadcast radio waves that consist of audio information and character information or the like multiplexed on the audio information, and an FM radio receiver 2 which is located within a reception area and receives the FM broadcast radio waves sent from the FM broadcasting station 1.

The FM radio receiver 2 has a function to output sounds carried on the received FM broadcast radio waves, and a function to display character information multiplexed on the received FM broadcast radio waves. The FM radio receiver 2 includes multiple keys for entering return message data with respect to returnable character information displayed, and an auto dialer for outputting DTMF (Dual Tone Multi-Frequency) signals according to the input return message data. As a user puts a loudspeaker, provided in the FM radio receiver 2 to output DTMF signals, against the telephone transmitter of a telephone 3, the DTMF signals according to a prestored telephone number of a service center 5 and the return message data are output from the loudspeaker. The output return message data is also sent to the service center via a telephone line network 4 in such a way.

The service center 5 stores this return message data together with return message data sent from other FM radio receivers, in accordance with return box number data (which will be discussed later) affixed to the return message data. The service center 5 also stores character data, which is to be multiplexed on FM radio waves and transmitted by the FM broadcasting station 1. The service center 5 sends those stored data to the FM broadcasting station 1 as needed.

Figure 2:
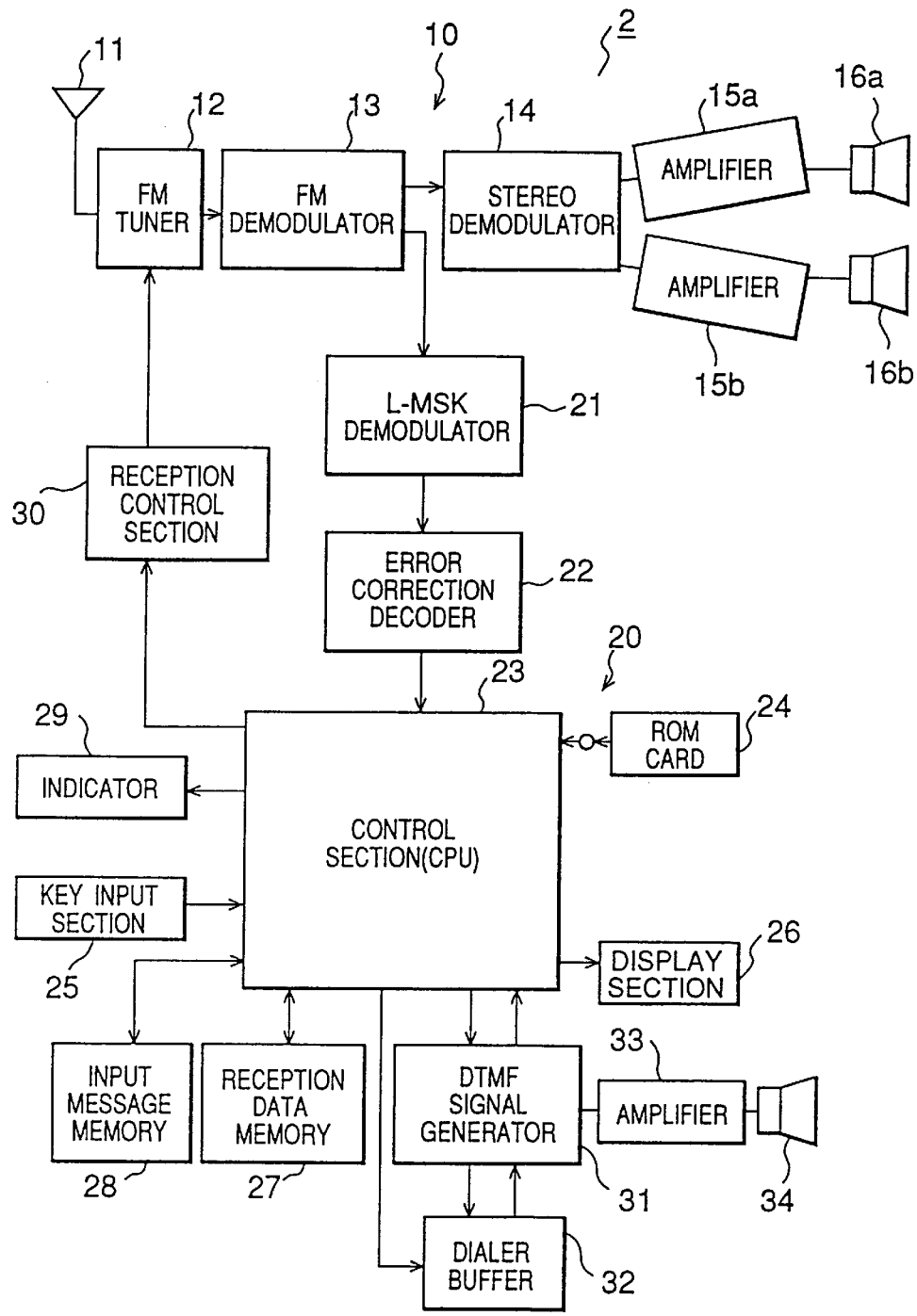
FIG. 2 is a block diagram showing the circuit structure of an FM radio receiver according to this embodiment.

FIG. 2 shows the circuit structure of the FM radio receiver 2. In this diagram, the FM radio receiver 2 has a FM radio receiving section 10, which receives FM broadcast radio waves and generates associated sounds to the FM broadcast radio waves, and a character information receiving section 20, which performs processes associated with character information multiplexed on FM broadcast radio waves received by the FM broadcast receiving section 10.

The FM broadcast receiving section 10 includes an antenna 11 for receiving FM broadcast radio waves, an FM tuner 12 for tuning FM broadcast radio waves, an FM demodulator 13 for demodulating an FM signal output from the FM tuner 12, a stereo demodulator 14 for demodulating the demodulated FM signal to stereo signals, a pair of amplifiers 15a and 15b for amplifying the output signals of the stereo demodulator 14, and a pair of loudspeakers 16a and 16b which output the stereo signals amplified by those amplifiers 15a and 15b as sounds.

When a stereo headphone is put into the stereo headphone jack (not shown) to be connected to the amplifiers 15a and 15b, a user can listen to an FM radio broadcast program through the headphone.

The character information receiving section 20 has an L-MSK (Level controlled Minimum Shift Keying) demodulator 21, an error correction decoder 22 and a control section 23. The L-MSK demodulator 21, connected to the FM demodulator 13, separates character information, which is digitally modulated in such a way that the levels of the multiplexed signals are changed by 4% to 10% with respect to the modulation levels of the L-R signal of the FM stereo and multiplexed on FM broadcast radio waves, from the FM radio waves. The L-MSK demodulator 21 then demodulates the separated character information. The error correction decoder 22 performs error correction on the character information demodulated by this L-MSK demodulator 21. The control section 23 performs various processes on the error-corrected character information.

Connected to this control section 23 are a ROM (Read Only Memory) card 24, a key input section 25, a display section 26, a reception data memory 27, an input message memory 28, an indicator 29, a reception control section 30 and a DTMF signal generator 31.

The control section 23, constituted of a CPU or the like, causes the display section 26 to display character information included in data received via the L-MSK demodulator 21 and the error correction decoder 22.

Figures 3A, 3B:
FIGS. 3A and 3B are diagrams exemplifying return form data stored in a ROM card which is installed in the FM radio receiver according to this embodiment.

What has been stored in the ROM card 24 include programs which are to be executed by the control section 23, plural types of return form data exemplified in FIGS. 3A and 3B, terminal identification (ID) data or user ID data, and the telephone number of the service center 5. The ROM card 24 is constituted of a magnetic recording medium, an optical recording medium or a recording medium like a semiconductor memory. This ROM card 24 is detachably installed into the main body of the FM radio receiver 2. Instead of the ROM card 24, an ROM may be permanently provided in the FM radio receiver 2. The programs, data, etc. which are to be recorded on the recording medium may be received from another device connected via a communication line or the like. Further, a storage device equipped with the recording medium may be provided on another device connected via a communication line or the like, so that programs and data stored in this recording medium can be used via the communication line.

The key input section 25 has tuning keys for tuning the FM tuner 12, a designation key for designating an FM teletext broadcast program, input keys for inputting return message data, a transmission key for instructing the transmission of the input return message data, and a mode key for setting the mode for inputting return message data. The display section 26, which is constituted of, for example, a liquid crystal display device equipped with a backlight and having a display area of 40 characters by 3 lines, displays the received character information or input return message data.

The reception data memory 27 stores received data (program data) including character information. The input message memory 28 stores return message data which has been input with respect to returnable program data stored in the reception data memory 27. The indicator 29, which comprises, for example, a plurality of LEDs and a drive circuit for the LEDs, displays the reception status stage by stage. The reception control section 30 controls the tuning frequency of the FM tuner 12.

The DTMF signal generator 31 generates DTMF signals associated with return message data stored in the input message memory 28. Under the control of the control section 23, the DTMF signal generator 31 sends signals to a dialer buffer 32 in which transmission data sent from the control section 23 is set, and sequentially latches the transmission data from the dialer buffer 32. The DTMF signal generator 31 generates DTMF signals, like "1" to "0," "*" and "#," associated with the transmission data acquired from the dialer buffer 32. The DTMF signals generated by the DTMF signal generator 31 are amplified by an amplifier 33 and are then output through a loudspeaker 34.

Figure 4:
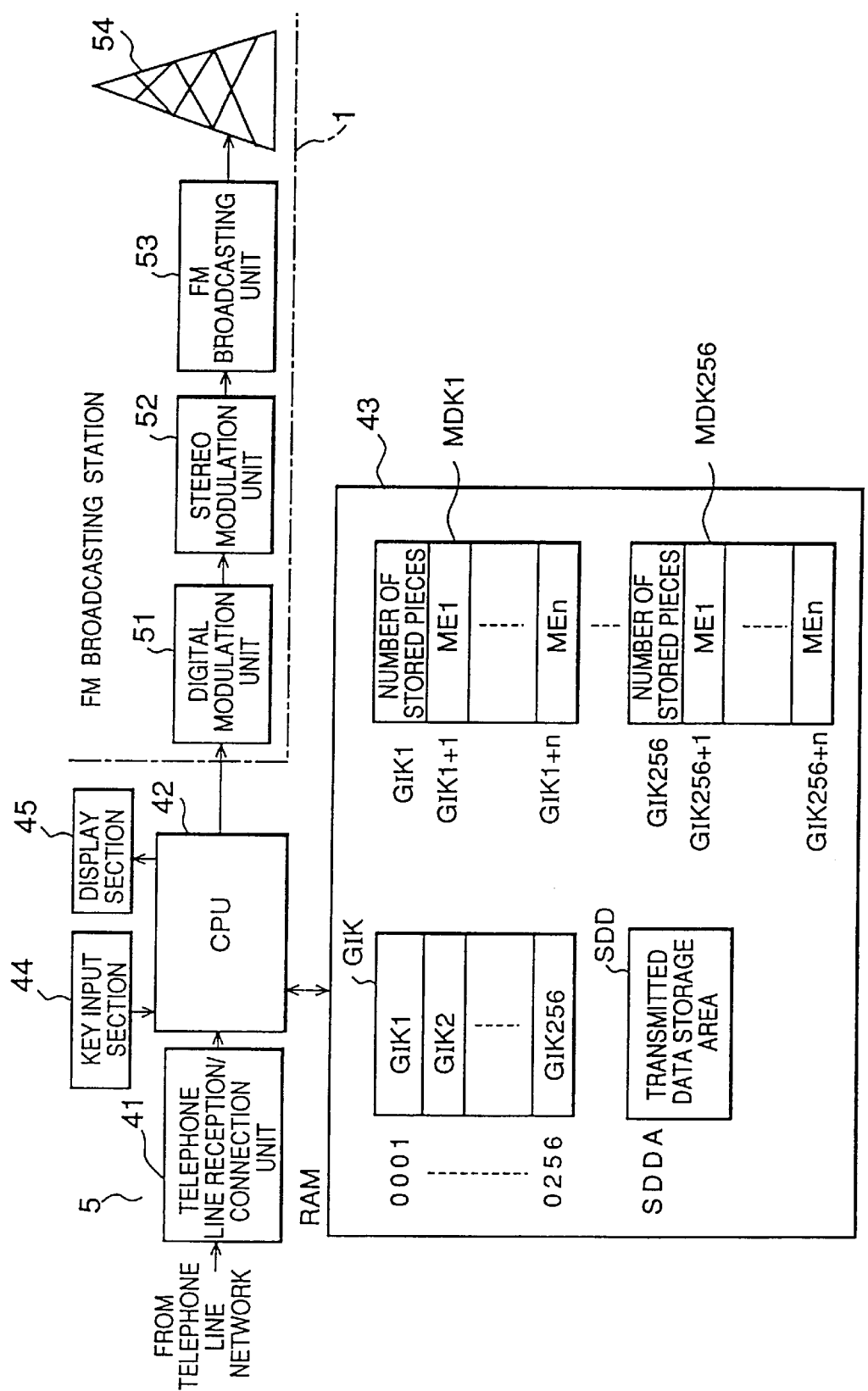
FIG. 4 is a block diagram mainly showing the circuit structure of a reception apparatus provided in a service center and the circuit structure of a transmission apparatus provided in an FM broadcasting station both according to this embodiment.

FIG. 4 is a diagram showing the circuit structure of a reception apparatus provided in the service center 5 and the circuit structure of a transmission apparatus provided in the FM broadcasting station 1.

The reception apparatus provided in the service center 5 comprises a telephone line reception/connection unit 41, a CPU 42, a RAM 43, a key input section 44 and a display section 45.

The telephone line reception/connection unit 41 receives return data, sent with the DTMF signals from the FM radio receiver 2 via the telephone line network 4, encodes the data into a predetermined code and sends the code to the CPU 42. The CPU 42 performs the general control of the operation of this reception apparatus, and is connected to the RAM 43, key input section 44 and display section 45.

The RAM 43, constituted of large-capacity semiconductor memories, stores the return data sent via the telephone line reception/connection unit 41. The key input section 44 has various kinds of keys for instructing the collection, edition and the like of data stored in the RAM 43. The display section 45, comprised of a CRT (Cathode Ray Tube) display or the like, displays the stored status of data stored in the RAM 43 and data to be transmitted to the FM radio station 1.

As illustrated, the RAM 43 has a transmission data storage area SDD having stored transmission data to be transmitted to the FM broadcasting station 1, a reception box head address data storage area GIK having stored a collection of head addresses of individual boxes for storing return data which has been received by the telephone line reception/connection unit 41, and reception message data storage areas (boxes) MDK1 to MDK256 for storing the received return data for each of box numbers "1" to "256."

The reception box head address data storage area GIK has stored the head addresses "GIK1" to "GIK256" of the reception message data storage areas MDK1 to MDK256 sequentially from the address "0001."

The reception message data storage areas MDK1 to MDK256 store the received return data for each of the box numbers "1" to "256," and the number of pieces of return data stored at that time is stored at the head address areas of "GIK1" to "GIK256."

The transmission data read from the transmission data storage area SDD of the RAM 43 or data acquired by collecting or editing return data stored in the individual reception message data storage areas MDK1 to MDK256 is sent to the FM broadcasting station 1 by the CPU 42.

Data sent from the service center 5 to the FM broadcasting station 1 is transmitted from a transmission apparatus provided in the FM broadcasting station 1. This information transmission apparatus comprises a digital modulation unit 51, a stereo modulation unit 52, an FM broadcasting unit 53 and an antenna 54. The digital modulation unit 51 affixes error correction codes to the data from the service station 5 in accordance with a predetermined format and performs L-MSK modulation to the data to which the error correction codes are affixed. The stereo modulation unit 52 performs stereo modulation on audio information and adds data output from the digital modulation unit 51 to the stereo-modulated data. The FM broadcasting unit 53 transmits the information modulated by stereo modulation unit 52 through the antenna 54 as FM broadcast radio waves.

A part or all of the processes which are to be executed by the service center 5 may be carried out by the FM broadcasting station 1.

The operation of the above-described embodiment will be described below.

Figure 5A:
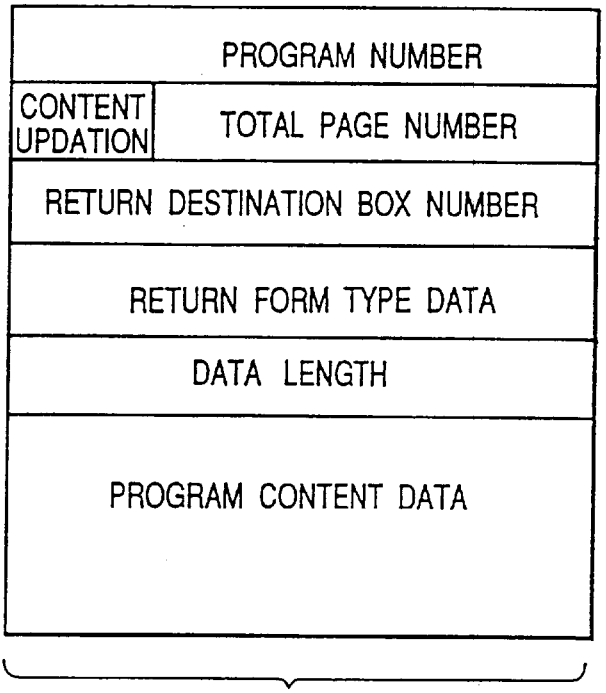
FIG. 5A is a diagram showing the format of program data to be transmitted from an FM broadcasting station according to this embodiment.

FIG. 5A shows the format of returnable program data multiplexed on FM broadcast radio waves which are transmitted by the FM radio receiver 2 from the FM broadcasting station 1. This program data consists of 1-byte information indicative of a program number, a 2-bit content update flag for updating the contents of the program, 6-bit information indicative of the total number of pages of program content data, 1-byte information of a return destination box number (to be discussed later), 1-byte return form type data (to be discussed later), 1-byte information on the data length of a program, and program content data having the data length indicated by the 1-byte data length information. It is to be noted that normal program data, which is not returnable, does not include the return destination box number information and the return form type data.

Figure 5B:
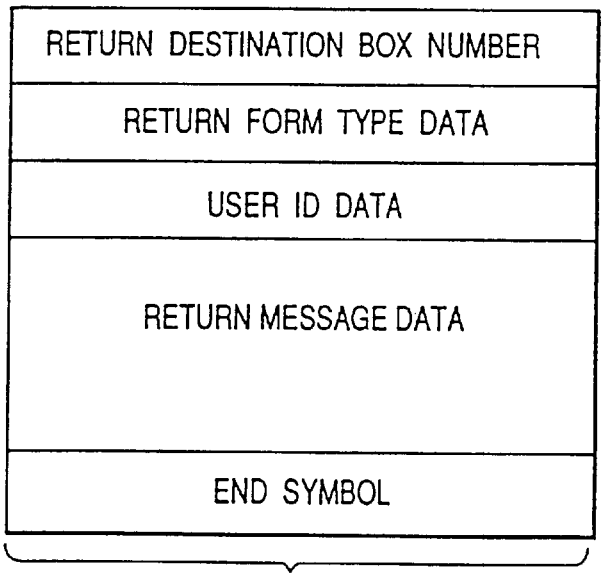
FIG. 5B is a diagram showing the format of return data to be transmitted from an FM radio receiver.

FIG. 5B shows the format of return data, for the returnable program data, which is to be transmitted to the service center 5 via the telephone 3 and the telephone line network 4 from the FM radio receiver 2. The return data consists of 1-byte information indicative of a return destination box number, 1-byte return form type data, 1-byte user ID data, return message data, which has a data structure and a data length according to the return form type, and 1-byte information of an end symbol.

Figure 6:
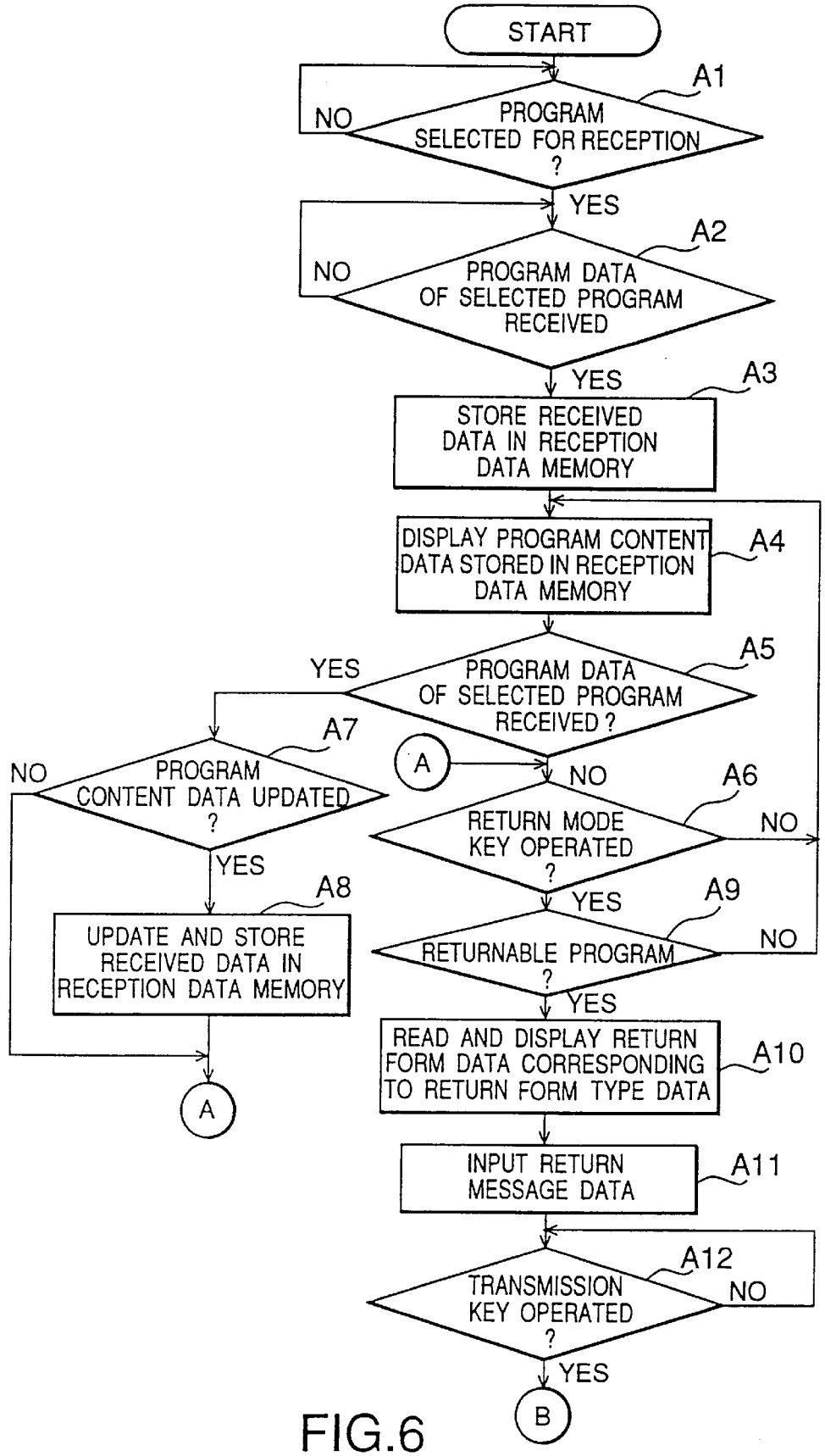
FIG. 6 is a flowchart illustrating reception and transmission procedures of the FM radio receiver according to this embodiment.
Figure 7:
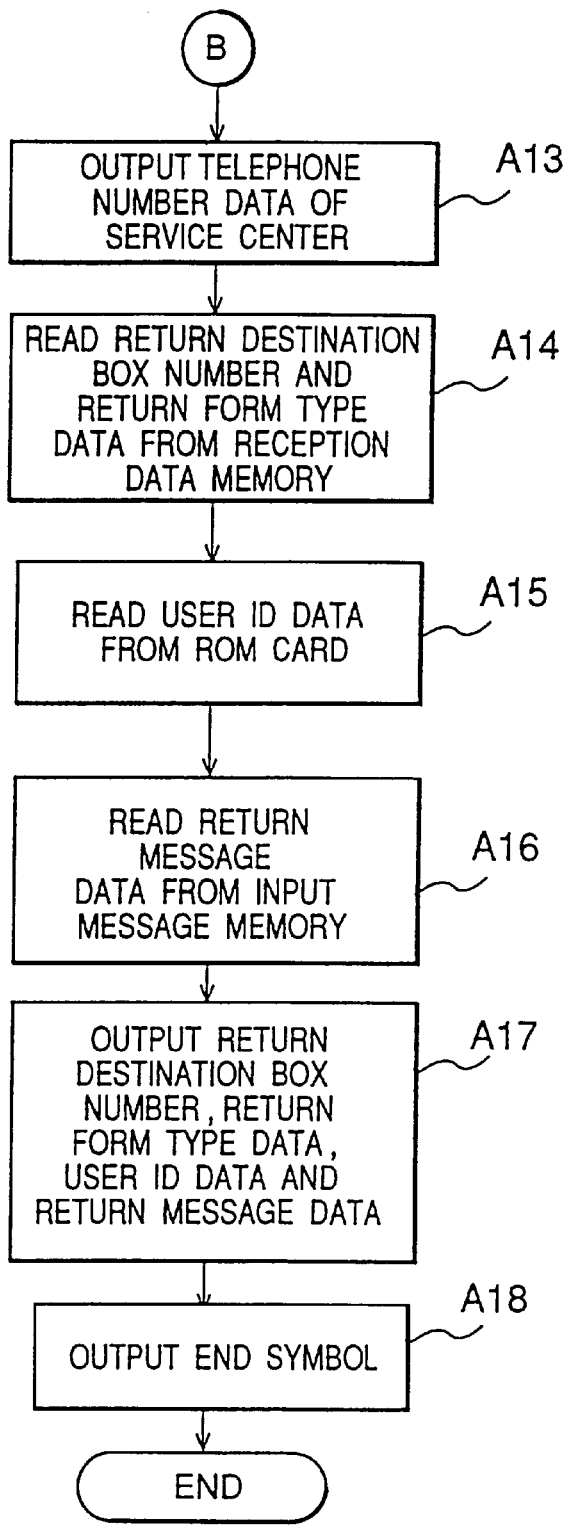
FIG. 7 is a flowchart illustrating reception and transmission procedures of the FM radio receiver following the procedures in FIG. 6.

The operation will be specifically described below. The flowchart in FIGS. 6 and 7 illustrates processes when the desired program is selected for reception by the manipulation of predetermined keys of the key input section 25 in the FM radio receiver 2. The program which accomplishes the individual functions illustrated in this flowchart is stored, as mentioned above, in the ROM card 24 as a recording medium in the form of program codes that can be read by the control section 23.

When the flow starts, it is determined if the desired program has been selected for reception from the program menu displayed on the display section 26 (step A1).

When it is determined in step A1 that the desired program has been selected, the reception of the selected program is waited for. In the subsequent step A2, it is determined if program data of the selected program has been received. When it is determined that the desired program data has been received, the received program data (received data) is stored in the reception data memory 27 (step A3), and the program content data in the stored received data is read and displayed on the display section 26 (step A4).

Figure 10A:
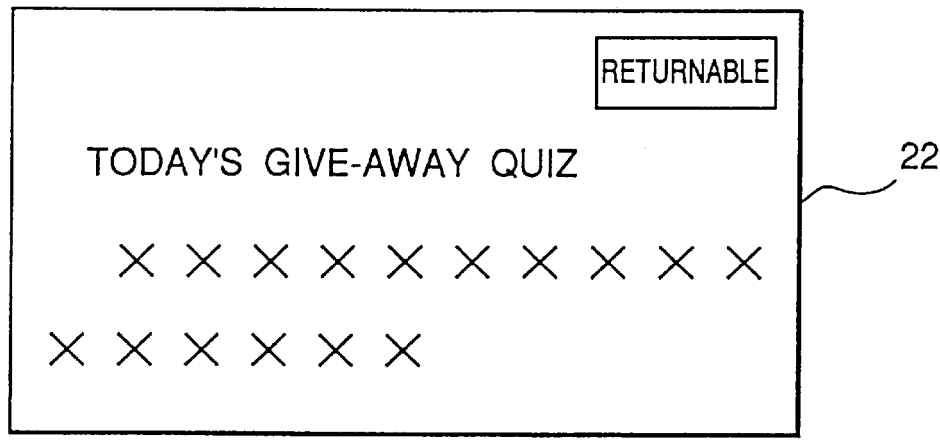
FIG. 10A is a diagram exemplifying a transmittable program.

In case that returnable program data is stored in the reception data memory 27, an image as shown in FIG. 10A, for example, is displayed on the display section 26 as shown in FIG. 10A.

Subsequently, it is determined again if the program data of the selected program has been received (step A5) and it is then determined if the return mode key provided at the key input section 25 has been operated to set the mode for inputting return message data for the displayed program (step A6). Those steps are repeated performed.

When it is determined again in step A5 that the program data of the selected program has been received, it is then determined in step A7 if the program data has been renewed by referring to the content update flag at the second byte position in the received data shown in FIG. 5A.

When the renewal of the program data is determined in this step, the received data stored in the reception data memory 27 is rewritten with the newly received data to update the program data which is in turn stored (step A8). After this step, the flow moves to step A6.

When it is determined in step A7 that the program data has not been updated yet, the flow moves to step A6 without updating the program data.

When the operation of the return mode key is determined in step A6, it is then determined whether or not the program displayed on the display section 26 is a returnable one by checking if the information of the return destination box number and the return form type data are included in the received data stored in the reception data memory 27 or the received data of the displayed program (step A9).

When it is not determined that the displayed program is a returnable one, the flow moves again to step A4 because it is impossible to return to the program.

Figure 10B:
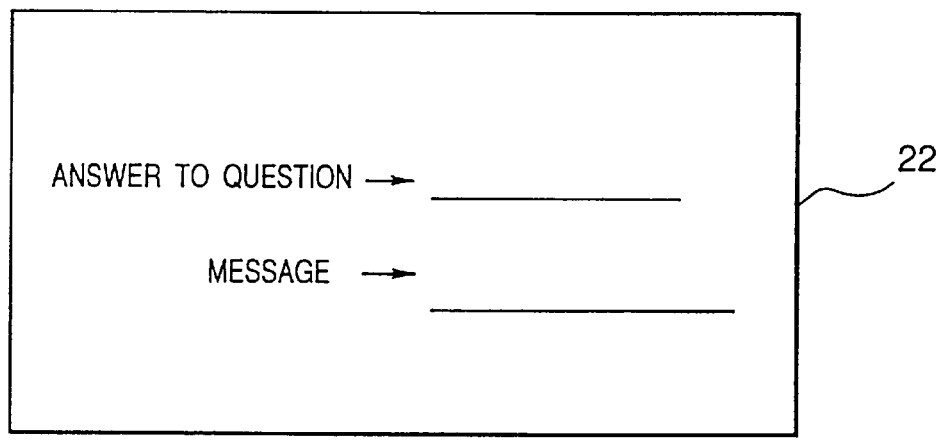
FIG. 10B is a diagram exemplifying a return form which is displayed at the time return message data is input.

When it is determined that the displayed program is a returnable one, the return form data corresponding to the return form type data which are included in the received data stored in the reception data memory 27 or the received data of the displayed program is read from the ROM card 24 and an image as shown in FIG. 10B, for example, is displayed on the display section 26 (step A10).

Then, in step A11, return message data, such as an answer to a quiz, a response to questionnaires or a request, with respect to received data stored in the reception data memory 27 is input in accordance with the displayed return form by the manipulation of the input keys provided at the key input section 25.

The input return message data is stored in the input message memory 28.

Subsequently, it is determined in step A12 if the transmission key provided at the key input section 25 has been operated. When the manipulation of the transmission key is determined, the telephone number data of the service center 5 is read from the ROM card 24 to be converted to DTMF signals first, and the converted DTMF signals are output to connect to the service center 5 via the telephone 3 and the telephone line network 4 (step A13).

Before the process in step A13, the user should put the loudspeaker 34 of the FM radio receiver 2 against the telephone transmitter of the telephone 3 as shown in FIG. 1.

When a predetermined time (sufficient for the line connection) passes after the outputting of the telephone number data of the service center 5 in step A13, or when the user who has confirmed the line connection to the service center 5 manipulates the transmission key, the information of the return destination box number and the return form type data at the third and fourth bytes in the program data, as shown in FIG. 5A, stored in the reception data memory 27 are read (step A14). Then, the user ID data is read from the ROM card 24 (step A15).

Next, the return message data, which has been input and stored in the input message memory 28 in step A11, is read (step A16). The return destination box number information, the return form type data, the user ID data and the return message data, read in steps A14 to A16, are sequentially converted to DTMF signals, which are then output. Accordingly, the return data is transmitted to the service center 5 via the telephone 3 and the telephone line network 4 (step A17).

Thereafter, the DTMF signals which corresponds to the end symbol in the return data are output (step A18) to disconnect the line to the service center 5, thereby terminating a sequence of processes.

In the flowchart in FIGS. 6 and 7, only the program data of the desired program selected by the user is received, stored and displayed. Alternatively, the program data of all programs may be received and stored so that when the user selects the desired program, the associated program data is retrieved from the stored program data and is displayed.

In the flowchart in FIGS. 6 and 7, the return destination box number data, the return form type data and the user ID data are all affixed to the return message data and the resultant data is transmitted to the service center 5. However, any one or any two of those additional information may be affixed to the return message data in accordance with the usage that reflects a difference in the type of a returnable program and the resultant return data may then be transmitted. Alternatively, only the return message data may be transmitted.

Figure 8:
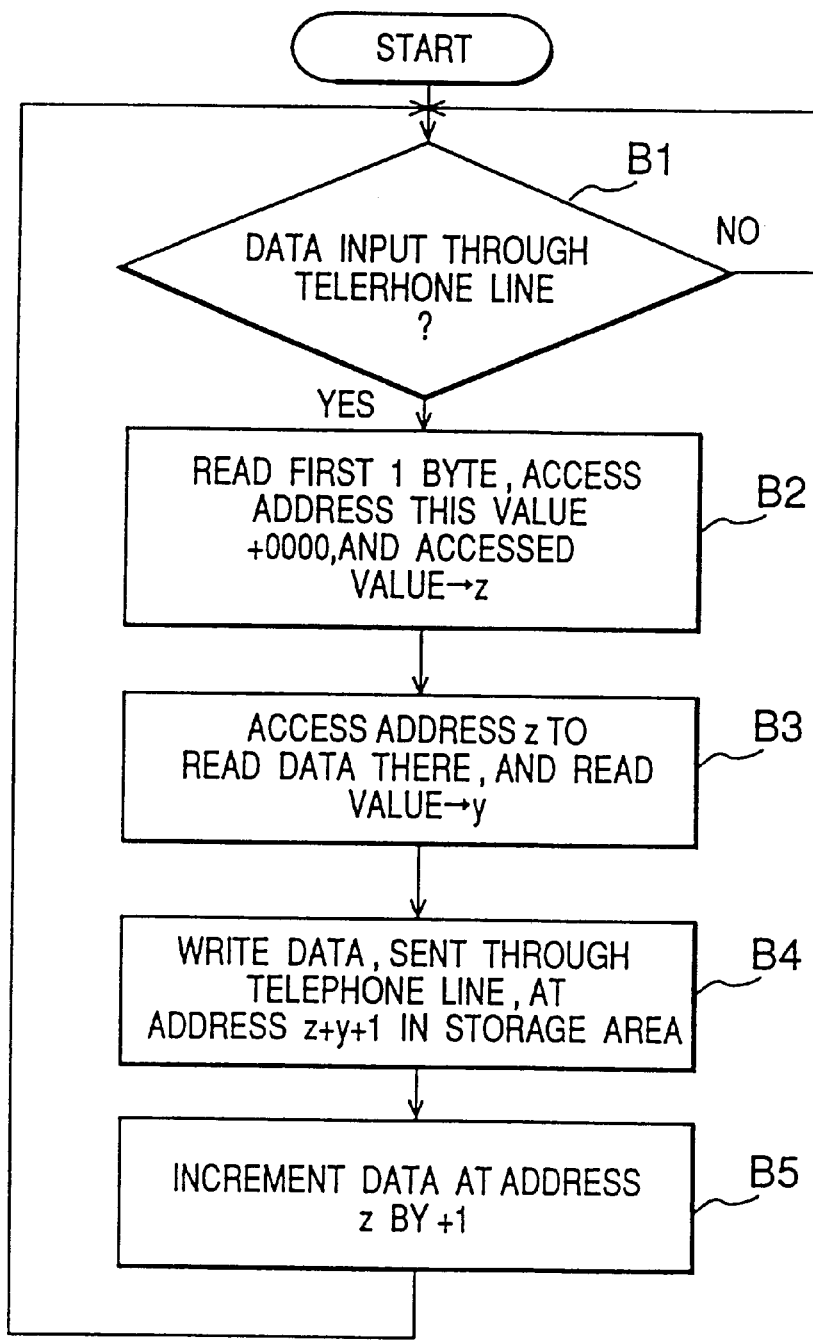
FIG. 8 is a flowchart illustrating procedures of receiving return data in the reception apparatus in a service center according to this embodiment.

When return data shown in FIG. 5B is transmitted in the above manner from the FM radio receiver 2 to the service center 5, the reception apparatus in the service center 5 performs a reception process as illustrated in FIG. 8.

FIG. 8 illustrates the reception process which are executed mainly by the CPU 42 in the service center 5. First, the CPU 42 stands by for the inputting (reception) of return data based on the presence/absence of a data input from the telephone line reception/connection unit 41 (step B1). When it is determined in step B1 that return data has been input, 1-byte return destination box number information affixed at the head of the sent return data is read and the address in the RAM 43 which is indicated by that value incremented by "+0000" is accessed to read out the head address of the box storing the return data following the return destination box number (any one of GIK1 to GIK256) or an address value z corresponding to the return destination box number (step B2).

Then, the address z in the RAM 43 is accessed to read the number of pieces, y, of return data stored in the associated box at that time (step B3).

Using the address value z and the number of stored pieces y, "z+y+1" is calculated to acquire the address in the storage area in the associated box where the received return data is to be written, and the return data received by the telephone line reception/connection unit 41 is written in the storage area in the RAM 43 specified by the computed address value (step B4).

When writing of the return data is completed, the value of the number of pieces of return data in the storage area in this box which is indicated by the address value z is updated by incrementing the value by "+1" (step B5). This completes the sequence of reception processes, after which the flow returns to the process in step B1.

Every time return data is received, the return data is additionally stored in the box in the RAM 43, which corresponds to the return destination box number. Thereafter, when the desired box is designated by some key operation of the key input section 44 in the reception apparatus in the service center 5, an editing process like collection is performed on the return data which is stored in the designated box.

Figure 9:
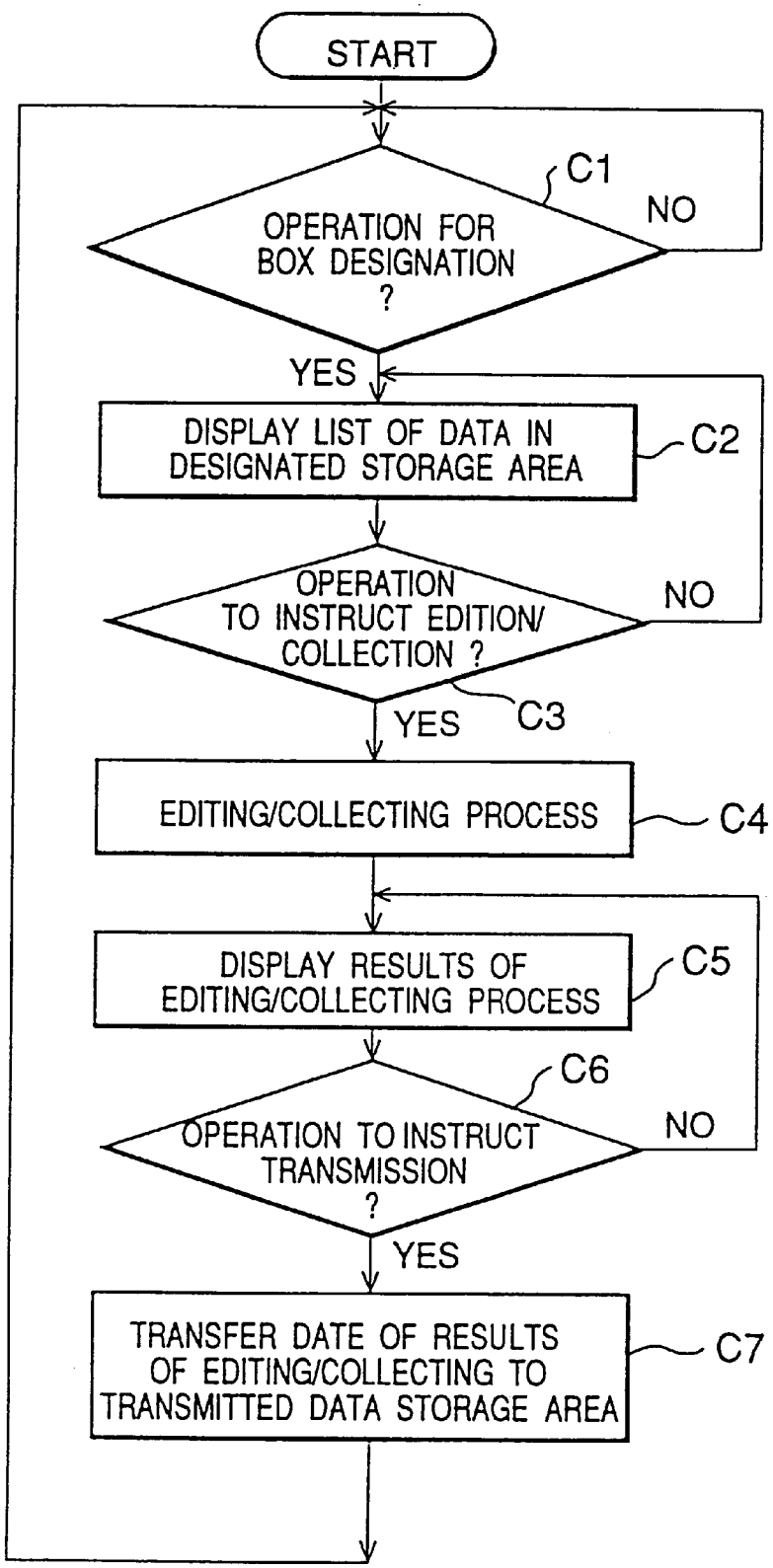
FIG. 9 is a flowchart illustrating procedures of editing and collecting return data in the reception apparatus in the service center according to this embodiment.

FIG. 9 shows the editing process the CPU 42 in the service center 5 performs. The CPU 42 checks if the desired box has been designated by a key input from the key input section 44 (step C1). When the box designation is detected in step C1, return data stored in the received message data storage area in the designated box is sequentially read out and a list of data is displayed on the display section 45 (step C2).

It is then determined if an instruction for instructing data edition/collection has been given through the key input section 44 (step C3). When such an instruction has been given in step C3, an editing/collecting process according to the type of the return data or the return form, such as the collection of answers to a quiz and the calculation of the ratio of the correct answers, the collection of responses to questionnaires and the preparation of a graph showing the results, or the calculation of the results of requests, is performed (step C4). The results of the process are then displayed on the display section 45 (step C5).

The data edition/collection in step C4 and the display of the results of the data edition/collection in step C5 will now be discussed specifically. When the box where answers to a quiz are stored is designated, a list of data is displayed and edition/collection is instructed, the answers are collated with the right answer and the ratio of the correct answers is computed from the number of the correct answers and the number of answers (return data) stored, or a list of the users who answered correctly is displayed.

When the box where responses to an awareness survey are stored is designated, a list of data is displayed and edition/collection is instructed, the ratios of similar responses are calculated and are displayed in the form of a pie chart, a bar chart or the like.

It is then determined if a transmission instruction to send the data of the displayed results of the edition/collection has been given through the key input section 44 (step C6). Only when it is determined in step C6 that the transmission instruction has been given, the result data is transferred to and stored in the transmission data storage area SDD in the RAM 43 (step C7). The display process in step C5 and the determination in step C6 are repeated until the transmission instruction is given in step C6.

When the aforementioned result data is stored in the transmission data storage area SDD in the RAM 43, this result data is read therefrom later at the proper timing. This data is processed into the data format as shown in FIG. 5A and is then sent to the FM broadcasting station 1 to be multiplexed on FM broadcast radio waves for transmission.

In the aforementioned step C2, a list of only return message data in the return data may be displayed. User registration information corresponding to the user ID data may be retrieved so that a list of such information is displayed. In this case, users should previously register the user registration information such as the terminal ID numbers, user names, addresses, telephone numbers, ages, sexes and/or occupations. The user registration information can be used in collecting answers to questionnaires.

In the flowchart in FIG. 8, when return message data is received, it is classified and stored in the box corresponding to the return destination box number. Instead, however, return message data upon reception may be stored without classification, and when box designation is performed in step C1 in the flowchart in FIG. 9, return message data affixed with the same return destination box number may be retrieved and a list of the retrieved return message data may then be displayed.

In the above-described embodiment, any user who has the FM radio receiver 2 capable of receiving FM teletext broadcasting can easily and actively participate to an FM teletext broadcast program. The broadcasting (service) provider can easily grasp the users' reactions to a broadcast program and can immediately reflect the acquired data on the program.

Although the FM radio receiver 2 converts return data for a returnable program to DTMF signals and output as such in this embodiment, this invention is not limited to this particular type. For example, this invention may be adapted to a receiving apparatus which is fixedly connected to a telephone line and transmits return data via the telephone line. This invention may also be adapted to a receiving apparatus which converts return data for a returnable program to an optical signal or an infrared signal to output.

Although FM teletext broadcasting system is applied to this invention in the aforementioned embodiment, this invention is not limited to this particular system. For example, this invention can also be adapted to other information transmission/reception systems, such as a TV teletext broadcasting system, a paging system, a telephone system, and a personal computer communication (Internet) system.

It should be apparent to those skilled in the art that this invention may be embodied in many other specific forms without departing from the spirit or scope of the invention.

We claim:

1. An information reception apparatus comprising:
   reception means for receiving a display information item which is broadcast from a broadcasting station and affixed with an identification information item, said identification information indicating a return destination for a return information item to be transmitted in response to said display information item;
   display means for displaying the display information received by the reception means;
   input means for inputting the return information item to be transmitted in response to the display information item displayed on the display means;
   information affixing means for affixing the identification information, which is affixed to the display information item displayed on the display means, to the return information item input by the input means; and
   transmission means for transmitting the return information item to which the identification information is affixed by the information affixing means.

2. The information reception apparatus according to claim 1, further comprising display means for displaying at least one of information received by said reception means and return information input from said input means.

3. The information reception apparatus according to claim 1, further comprising:

telephone number storage means for storing telephone number data with respect to the return destination of said return information; and transmission control means for transmitting said telephone number data stored in said telephone number storage means before transmitting said return information affixed with said identification information from said transmission means.

4. The information reception apparatus according to claim 1, further comprising user information storage means for storing user information;

wherein said information affixing means further affixes said user information stored in said user information storage means to said return information input from said input means; and wherein said transmission means transmits said return information affixed with said identification information and said user information.

5. The information reception apparatus according to claim 1, wherein:

said reception means receives the display information item affixed with a designation information item for designating return forms of the identification information item and the return information item;

the information reception apparatus further comprises return form storage means for storing a plurality of return form information items; and said input means includes means for inputting the return information item in accordance with the return form designated by the designation information item which is displayed on the display means.

6. The information reception apparatus according to claim 1, wherein said reception means receives the display information item affixed with the identification information item which is transmitted by being multiplexed on FM broadcast radio waves.

7. The information reception apparatus according to claim 1, wherein:

said reception means receives a plurality of display information items;

said information reception apparatus further comprises selection means for selecting a desired display information item from said plurality of display information items received by the reception means; and said display means displays the display information item selected by the selection means.

8. The information reception apparatus according to claim 1, further comprising display control means for displaying the return information item input by the input means on the display means.

9. The information reception apparatus according to claim 1, wherein:

said reception means further receives a display information item to which no identification information item is affixed; and the information reception apparatus further comprises prohibition means for prohibiting input of the return information item by the input means when there is no identification information item affixed to the display information item displayed on the display means.

10. An information reception apparatus comprising:

reception means for receiving a display information item affixed with a designation information item, said designation information item designating a return form of a return information item to be transmitted in response to the display information item;

display means for displaying the display information item received by the reception means;

return form storage means for storing a plurality of return forms;

input means for inputting the return information item in accordance with a designated one of the return forms stored in said return form storage means when the return information item to be transmitted is inputted in response to the display information item displayed on the display means, said designated one of the return forms being designated by the designation information item affixed to the display information item displayed on the display means; and transmission means for transmitting the return information input by the input means.

11. The information reception apparatus according to claim 10, further comprising:

read means for reading a return form information item corresponding to the designation information item which is affixed to the display information item displayed on the display means; and display control means for permitting the display means to display the return form information item read by the read means; and wherein said input means inputs the return information item in accordance with the displayed return form.

12. The information reception apparatus according to claim 10, wherein said return form storage means is attachable to and detachable from said information reception apparatus.

13. The information reception apparatus according to claim 10, further comprising information display means for displaying at least one of information received by said reception means and return information input by said input means.

14. The information reception apparatus according to claim 10, further comprising:

telephone number storage means for storing telephone number data with respect to a return destination of said return information; and transmission control means for transmitting said telephone number data stored in said telephone number storage means before transmitting said return information from said transmission means.

15. The information reception apparatus according to claim 10, further comprising:

information affixing means for affixing the designation information item which is affixed to the display information item displayed on the display means to the return information item input by the input means; and wherein said transmission means transmits the return information item to which the designation information item is affixed by the information affixing means.

16. The information reception apparatus according to claim 10, further comprising:

user information storage means for storing user information; and user information affixing means for affixing said user information stored in said user information storage means to said return information input from said input means; and wherein said transmission means transmits said return information affixed with said user information by said user information affixing means.

17. The information reception apparatus according to claim 10, wherein said reception means receives the display information item affixed with the designation information item which is transmitted by being multiplexed on FM broadcast radio waves.

18. An information transmission apparatus comprising:
   information affixing means for affixing identification information item to a display information item to be broadcast, said identification information indicating a return destination and being affixed to a return information item to be transmitted in response to the display information item;
   broadcasting means for broadcasting the display information item to which the identification information item is affixed by the information affixing means;
   reception means for receiving the return information item affixed with the identification information item;
   storage means for storing the return information item received by the reception means; and
   information processing means for at least one of displaying, collecting, and editing the return information item stored in the storage means for each identification information item.

19. The information transmission apparatus according to claim 18, wherein:
   said information affixing means further affixes a designation information item to the display information item to be broadcast, said designation information item designating a return form of the return information item to be transmitted in response to the display information item; and
   said broadcasting means broadcasts the display information item to which the identification information item and the designation information item are affixed by the information affixing means.

20. The information transmission apparatus according to claim 18, further comprising:
   reception means for receiving return information affixed with identification information indicative of a return destination; and
   storage means for storing said return information received by said reception means.

21. The information transmission apparatus according to claim 20, wherein:
   said storage means comprises a plurality of storage areas; and
   said information transmission apparatus further comprises storage control means for storing said return information into one of said storage areas in accordance with said identification information received by said reception means.

22. The information transmission apparatus according to claim 20, further comprising display means for displaying said return information stored in said storage means for each identification information.

23. The information transmission apparatus according to claim 20, further comprising information processing means for at least one of collecting and editing said return information stored in said storage means for each identification information.

24. The information transmission apparatus according to claim 18, wherein said broadcasting means broadcasts information which is displayed, collected, or edited by the information processing means.

25. The information transmission apparatus according to claim 23, further comprising display means for displaying information which is collected or edited by said information processing means.

26. The information transmission apparatus according to claim 18, wherein said broadcasting means transmits the display information item to which the identification information item is affixed by the information affixing means by being multiplexed on FM broadcast radio waves.

27. An information transmission apparatus comprising:
   information affixing means for affixing a designation information item to a display information item to be transmitted; and
   transmission means for transmitting the display information item to which the designation information item is affixed by the information affixing means; and
   wherein said designation information item designates at least one of a plurality of return forms stored in a storage means as an input form for inputting a return information item, in an information reception apparatus for receiving the display information item to which the designation information item is affixed.

28. An information transmission/reception system comprising:
   (i) an information transmission apparatus for broadcasting a display information item, said information transmission apparatus including:
      first information affixing means for affixing an identification information item indicating a return destination to the display information item to be broadcast, said identification information item being affixed to a return information for information item to be transmitted in response to the display information item; and
      broadcasting means for broadcasting the display information item to which the identification information item is affixed by the first information affixing means; and
   (ii) an information reception apparatus for receiving the display information item which is broadcast from the information transmission apparatus, said information reception means including:
      first reception means for receiving the display information item affixed with the identification information item which is broadcast from the broadcasting means;
      display means for displaying the display information item received by the first reception means;
      input means for inputting the return information item to be transmitted in response to the display information item displayed by the display means;
      second information affixing means for affixing the identification information item to the return information item input by the input means, said identification information item being affixed to the display information item displayed by the display means; and
      transmission means for transmitting the return information item to which the identification information item is affixed by the second information affixing means; and
   (iii) wherein said information transmission apparatus further comprises:
      second reception means for receiving the return information item affixed with the identification information item which is transmitted from the transmission means;
      storage means for storing the return information item received by the second reception means; and
      information processing means for at least one of displaying, collecting, and editing the return information item stored in the storage means for each identification information item.

29. An information transmission/reception system comprising:

(i) an information transmission apparatus for transmitting a display information item, said information transmission apparatus including:

information affixing means for affixing a designation information item to the display information item to be transmitted, said designation information designating a return form of a return information item to be transmitted in response to the display information item; and first transmission means for transmitting the display information item to which the designation information item is affixed by the information affixing means; and (ii) an information reception apparatus for receiving the display information item which is transmitted from the information transmission apparatus, said information reception means including:

reception means for receiving the display information item affixed with the designation information item which is transmitted from the first transmission means;

display means for displaying the display information item received by the reception means;

storage means for storing a plurality of return forms;

input means for inputting the return information item in accordance with a designated one of the return forms stored in the storage means when the return information item to be transmitted is inputted in response to the display information item displayed on the display means, said designated one of the return forms being designated by the designation information item affixed to the display information item displayed by the display means; and second transmission means for transmitting the return information item input by the input means.

30. An information reception method comprising:

receiving a display information item which is broadcast by a broadcasting station and affixed with an identification information item, said identification information item indicating a return destination for return information to be transmitted in response to the display information item;

displaying the received display information item;

affixing the identification information affixed to the displayed display information to the return information input; and transmitting the return information affixed with the identification information item.

31. An information reception method comprising:

receiving a display information item affixed with a designation information item, said designation information item designating one of a plurality of return forms stored in a storage medium;

displaying the received display information item;

inputting a return information item in a manner such that the return information item has the return form designated by said designation information item affixed to said displayed display information item; and transmitting the input return information item.

32. An information transmission method comprising:

affixing a designation information item to a display information item to be transmitted; and transmitting the display information item affixed with the designation information item; and wherein said designation information item designates at least one of a plurality of return form information items stored in a storage means as an input form when a return information item to be transmitted in response to the display information item is input into an information reception apparatus for receiving the display information item affixed with the designation information item.

33. An information transmission method comprising:

affixing an identification information item to a display information item to be broadcast, said identification information item indicating a return destination and being affixed to a return information item to be transmitted in response to the display information item; and broadcasting the display information item affixed with the identification information item;

receiving the return information item affixed with the identification information item;

storing the received return information item; and one of displaying, collecting, and editing the return information item stored for each identification information item.

* * * * *